(12) United States Patent
Becker et al.

(10) Patent No.: US 9,550,344 B2
(45) Date of Patent: Jan. 24, 2017

(54) USE OF SILANE-MODIFIED POLYOLEFINS AS ADHESION PROMOTERS FOR THE PRODUCTION FLAT LAMINATES

(75) Inventors: Hinnerk Gordon Becker, Essen (DE); Hans-Dieter Zagefka, Haltern am See (DE); Hans Guenther Wey, Muelheim (DE); Friedrich Georg Schmidt, Haltern am See (DE); Dirk Hoppe, Nottuln (DE); Martin Kothe, Altenstadt (DE)

(73) Assignee: Evonik Degussa GmbH, Essen (DE)

( * ) Notice: Subject to any disclaimer, the term of this patent is extended or adjusted under 35 U.S.C. 154(b) by 567 days.

(21) Appl. No.: 12/992,792

(22) PCT Filed: Jul. 8, 2009

(86) PCT No.: PCT/EP2009/058666
§ 371 (c)(1),
(2), (4) Date: Nov. 15, 2010

(87) PCT Pub. No.: WO2010/018034
PCT Pub. Date: Feb. 18, 2010

(65) Prior Publication Data
US 2011/0088777 A1    Apr. 21, 2011

(51) Int. Cl.
| | | |
|---|---|---|
| B32B 17/10 | (2006.01) | |
| B32B 7/12 | (2006.01) | |
| B32B 27/08 | (2006.01) | |
| C08F 255/00 | (2006.01) | |
| C08L 51/06 | (2006.01) | |
| C09J 123/16 | (2006.01) | |
| C09J 123/26 | (2006.01) | |
| C09J 151/06 | (2006.01) | |
| B32B 27/32 | (2006.01) | |

(52) U.S. Cl.
CPC ........... B32B 17/10908 (2013.01); B32B 7/12 (2013.01); B32B 17/10018 (2013.01); B32B 17/10119 (2013.01); B32B 17/10926 (2013.01); B32B 27/08 (2013.01); B32B 27/32 (2013.01); C08F 255/00 (2013.01); C08L 51/06 (2013.01); C09J 123/16 (2013.01); C09J 123/26 (2013.01); C09J 151/06 (2013.01); B32B 2255/10 (2013.01); B32B 2255/26 (2013.01); B32B 2307/704 (2013.01); B32B 2307/724 (2013.01); B32B 2457/00 (2013.01); B32B 2457/20 (2013.01); Y10T 428/269 (2015.01); Y10T 428/31612 (2015.04)

(58) Field of Classification Search
None
See application file for complete search history.

(56) References Cited

U.S. PATENT DOCUMENTS

| | | |
|---|---|---|
| 5,075,382 A | 12/1991 | Ohmae et al. |
| 5,792,560 A | 8/1998 | Friedman et al. |
| 5,994,474 A | 11/1999 | Wey et al. |
| 6,159,608 A | 12/2000 | Friedman et al. |
| 6,287,674 B1 | 9/2001 | Verlinden et al. |
| 7,014,886 B2 | 3/2006 | Vey et al. |
| 8,025,758 B2 | 9/2011 | Loehden et al. |
| 2006/0134355 A1 | 6/2006 | Olofsson et al. |
| 2008/0167421 A1* | 7/2008 | Yalvac .................. C08F 255/02 524/570 |
| 2008/0213515 A1 | 9/2008 | Vey et al. |
| 2008/0214757 A1 | 9/2008 | Becker et al. |
| 2009/0226728 A1* | 9/2009 | Onoe et al. .................... 428/413 |
| 2010/0143676 A1* | 6/2010 | Hahn et al. .................... 428/212 |
| 2010/0279033 A1 | 11/2010 | Becker et al. |
| 2010/0285246 A1 | 11/2010 | Becker et al. |

FOREIGN PATENT DOCUMENTS

| | | | |
|---|---|---|---|
| DE | 26 50 118 | 5/1978 | |
| EP | 1 013 413 | 6/2000 | |
| EP | 1 038 663 | 9/2000 | |
| GB | 1305449 A * | 1/1973 | ............... B05D 7/02 |
| JP | 10158330 A * | 6/1998 | |
| JP | 2007 177034 | 7/2007 | |
| WO | WO 2005108442 A1 * | 11/2005 | |
| WO | 2008 036222 | 3/2008 | |

OTHER PUBLICATIONS

English machine translation of JP 10158330 from JP IPDL (1998).*
International Search Report issued Oct. 27, 2009 in PCT/EP09/058666 filed Jul. 8, 2009.
U.S. Appl. No. 12/990,955, filed Nov. 4, 2010, Becker, et al.
U.S. Appl. No. 12/830,628, filed Jul. 6, 2010, Becker, et al.
U.S. Appl. No. 12/830,869, filed Jul. 6, 2010, Becker, et al.
U.S. Appl. No. 12/830,889, filed Jul. 6, 2010, Becker, et al.
U.S. Appl. No. 13/201,522, filed Aug. 15, 2011, Kohlstruk, et al.
U.S. Appl. No. 13/144,968, filed Jul. 18, 2011, Kohlstruk, et al.

* cited by examiner

*Primary Examiner* — Kenneth Stachel
(74) *Attorney, Agent, or Firm* — Oblon, McClelland, Maier & Neustadt, L.L.P.

(57) ABSTRACT

The invention relates to the use of polyolefins modified with one or more silanes as adhesion promoters for the production of flat glass/glass, glass/plastic, or plastic/plastic laminates, to corresponding laminates, and to displays containing the laminates according to the invention.

20 Claims, No Drawings

USE OF SILANE-MODIFIED POLYOLEFINS AS ADHESION PROMOTERS FOR THE PRODUCTION FLAT LAMINATES

The present invention relates to the use of one or more silane-modified polymers as adhesion promoters for the production of flat laminates based on glass and/or plastic, the corresponding laminates, as well as displays containing the laminates according to the invention.

Composite materials play an increasing role in many areas of application. In general composite materials are materials of two or more components joined together. The composite material has material properties other than those of its individual components. Material properties and the geometry of the components are important as regards the properties of the composite materials. In particular size effects often play a role. The joining is carried out by integral closure or self-closure or a combination of the two.

Depending on the geometry of the composite, a distinction is made between:
  Particle composite materials, also termed dispersion materials,
  Fiber composite materials,
  Layer composite materials, also termed laminates,
  Infiltration composite materials.

Layer composite materials consist of different numbers of layers lying on top of one another and are used in numerous applications such as for example in window construction, in packagings, but also in electronic components such as for example displays. In many cases the joining of laminates is achieved by bonding, in which the nature of the bonding can differ.

The use of coated glass surfaces for producing electrical components has already been known for a long time. Thus, in WO 00/05180 flexible substrates based on thin glass plates are described, which are coated with synthetic resins, and which are said to be suitable for use in light-emitting components (e.g. LEDs). As examples of suitable synthetic resins there are mentioned polyurethane resins, preferably two-component systems (2P) with additional UV hardenability are employed. The glass surface is preferably pretreated by a silane primer preferably present in aqueous emulsion, in order to achieve a bonding of the synthetic resin to the glass surface. The solvent used has to be removed, and in addition a heat treatment is described as a further process step. A use of partially crystalline polyolefins and/or silane-modified (partially crystalline) polyolefins for the interlocking (self-closure) joining of glass and plastics disks is not described. When using temperature-hardened adhesive layers there is the danger of a damage to the functional layers of the laminates due to the cross-linking step (the heat treatment). If additional primer systems are applied as described, based on an aqueous dispersion or emulsion, then moisture is thereby introduced into the system, which can irreversibly damage the sensitive layers, and therefore has to be removed in a time-consuming and complicated manner before the next laminating step. This additional step makes the production process economically unattractive. With UV hardening only materials with high transmission values can be used to produce the laminates. In addition, a lamination of plastics based on non-polar polymers, in particular polyolefins, with the aforedescribed systems is possible only after an energetic pre-treatment of the plastics surfaces (corona, flame treatment, etc.), since otherwise no permanent bonding is obtained.

In WO 99/21708 glass laminates as basic components of semiconductor elements as well as a process for their production are described. The joining of the laminate layers is effected either via so-called vacuum lamination or by using an adhesive layer. The adhesive layers are applied as hot-melt adhesives or in the form of aqueous latex dispersions, and are then hardened by application of pressure and heat. Also, the use of slightly moistened gelatine layers as adhesive layer is described. As adhesive layers there are also described pressure-sensitive adhesive layers and adhesive layers that harden by thermal radiation, by electron beam radiation or UV radiation. In particular aqueous temperature-hardening systems are mentioned. As polymer binders within the aforementioned adhesive layers, styrene-isoprene block copolymers, styrene butadiene rubber (elastomers), butyl rubber, polyisobutylenes, silicones, natural rubber (rubber) and acrylate copolymers are mentioned. Particularly preferred are polymers based on alkyl acrylate esters. A use of partially crystalline polyolefins and/or silane-modified (partially crystalline) polyolefins for the interlocking joining of glass and plastics disks is not described. Conventional pressure-sensitive adhesive systems do not lead to a reactive bonding of the surfaces to be joined. When using temperature-hardening adhesive layers there is the danger of damage to the functional layers of the laminates due to the cross-linking step (the heat treatment). If these systems are applied as described, based on an aqueous dispersion, then moisture is thereby introduced into the system, which can irreversibly damage the sensitive layers and therefore has to be removed in a complicated and time-consuming manner before the next laminating step. With UV hardening only materials with high transmission values can be used for the production of the laminates. In addition a lamination of plastics films based on non-polar polymers, in particular polyolefins, is possible with the described systems only after an energetic pretreatment of the plastics surfaces (corona, flame treatment, etc.), since otherwise no permanent bonding is obtained. Also described is the pretreatment of the glass surfaces for the application of the functional layers. This is necessary in order to allow a bonding of the functional layers to the glass, and is realized by etching or coating the glass surface with a so-called primer. This additional step makes the described production process economically attractive.

Also, in EP 1013413 laminates based on thin glass layers and a plastics carrier are described, which contain electrically conducting, organic layers. The bonding between the glass layer and the thermoplastic carrier layer is achieved by so-called vacuum lamination or by using an adhesive layer. As adhesive layers there are mentioned pressure-sensitive adhesive layers and adhesive layers that harden by thermal radiation or UV radiation. A use of partially crystalline polyolefins and/or silane-modified (partially crystalline) polyolefins for the interlocking joining of glass and plastics disks is not described. Conventional pressure-sensitive adhesive systems do not lead to a reactive bonding of the surfaces to be joined. When using temperature-hardening adhesive layers there is the danger of damage to the functional layers of the laminates due to the cross-linking step (the heat treatment). With UV hardening only materials with high transmission values can be used for the production of the laminates. In addition a lamination of plastics films based on non-polar polymers, in particular polyolefins, with the described systems is possible only after an energetic pretreatment of the plastics surfaces (corona, flame treatment, etc.), since otherwise no permanent bonding is obtained.

EP 1038663 describes the production of electronic "modules" using glass laminates. In this case coated plastics films carrying a functional layer are laminated with flexible glass disks, so that the functional layers of the plastics films are protected against mechanical stress, heat and oxidative and/or hydrolytic decomposition. Displays are mentioned as the preferred application. The plastics films provided with functional coatings are joined together with the aid of an surrounding sealing layer that is based on epoxy, silicone and/or urethane acrylate resins. In the lamination of the glass layer(s) to the functionalized plastics films the so-called vacuum lamination procedure is preferably employed, which dispenses with the use of adhesive layers. As an alternative two-sided adhesive strips or adhesive layers are mentioned, in which the latter are also based on hot-melt adhesives that can be hardened by UV or electron beam radiation. The use of slightly moistened gelatine layers and polyethylene films as adhesive layer is also described. A use of partially crystalline polyolefins and/or silane-modified (partially crystalline) polyolefins for the interlocking joining of glass and plastics disks is not described. With UV hardening only materials with high transmission values can be used to produce the laminates. The use of epoxy, silicone and/or urethane/acrylate resin systems leads to significantly higher production costs, which militates against a technical scaling-up. In addition a lamination of plastics films based on non-polar polymers, in particular polyolefins, with such systems is possible only after an energetic pretreatment of the plastics surfaces (corona, flame treatment, etc.), since otherwise no permanent adhesion is achieved.

Flat flexurally elastic composites based on a glass layer and a polymer, in which an adhesion promoter is contained between the glass and the polymer, are also described in WO 03/055676. As adhesion promoters there are likewise used aqueous, UV-hardenable dispersions of polyacrylates or styrene/butadiene copolymers. With UV hardening only materials with high transmission values can be used to produce the laminates. Also, when using aqueous systems the aqueous component must be completely removed in an additional process step, which complicates the production process. Furthermore traces of water already present in hydrolytically sensitive polymers such as for example polyamides, polyesters, etc., cause a significant deterioration of the light permeability (cloudiness as a result of polymer decomposition).

It is likewise known that functionalized, in particular silane-functionalized polyolefins, can be used in adhesives and bonding agents.

Thus, for example, silane-modified unsaturated amorphous polymers are described in WO 91/06580, which can be used in the crosslinked state, for example as moulded articles. Adhesive compositions, also of hot-melt adhesives, are mentioned as further examples of application of silane-modified polymers. As examples of unsaturated base polymers there are mentioned rubber-like polymers, such as for example styrene-butadiene block copolymers (SBS), styrene-isoprene block copolymers (SIS), styrene-butadiene rubber (SBR), nitrile rubber, polychloroprene rubber and butyl rubber. All the aforementioned base polymers exhibit a rubber-like elasticity (i.e. also poor processability) and/or other negative material properties (such as for example poor heat resistance), which make them unsuitable for hot-melt adhesive applications.

In WO 89/11513 an adhesive composition is described that contains at least one silane-modified or silane-grafted partially crystalline polymer. As base polymers there are mentioned in particular homopolymers, copolymers and terpolymers of $C_{2-6}$ α-olefins as well as isotactic polypropylene polymers and blends of polypropylenes, in particular if they also contain atactic polypropylene. In the grafting of isotactic polypropylene (iPP) an extremely rapid and complete polymer decomposition occurs on account of the molecular structure of the iPP, which means that only very low functionalization rates can be achieved, and the grafted products in addition have a strongly wax-like character. Atactic polypropylene on the other hand is characterized by a very low softening point [see for example: H.-G. Elias; Makromoleküle, Vol. III; Wiley-VCH: Weinheim; 2001]. The procedure described in WO 89/11513 leads to an accumulation of these disadvantages, and to a very poor product performance as regards the material properties. The adjustment of viscosity, melt behavior and "tack" of the adhesive composition is causally attributed to the use of relatively long chain (≥3 connecting atoms between the Si atom and the polymer chain) silane monomers, which should lead to an "open structure". The use of relatively long chain silane monomers is disadvantageous insofar as it leads to a weaker cross-linking due to a higher degree of polymerization of the network chains (i.e. the monomer base units between two cross-linking sites), which additionally adversely affects the material properties of the graft polymer.

Further examples can be found in WO 2007/002177, in WO 2007/008765 and in EP 0827994.

Also, the good bonding of silane-modified polymers to glass surfaces is known.

Thus, for example, WO 97/48778 describes a hot-melt adhesive composition consisting of a reactive and a non-reactive binder, in which the reactive binder can be a silane-functional polyisobutylene, hydrated polybutadiene or poly-alpha-olefin. The aforementioned compositions are used as a two-component adhesive for the production of double-disk or multidisk insulating glass panels. The described use does however not involve a flat laminate, flat plastics layers are also hardly mentioned, and in addition it cannot be assumed that the produced insulating glass windows are particularly flexible.

The same comments also apply to the insulating glass seals described in U.S. Pat. No. 5,849,832.

The use of silane-modified partially crystalline polyolefins for the construction of complex flat structures is not hitherto known. In particular, the hitherto known silane-modified partially crystalline polyolefins are, on account of their material properties, able only to a limited extent to guarantee the material performance required for the production of demanding composite laminates (such as are used for example in the maintenance and electrical industries).

The object of the present invention was therefore to provide alternative adhesion promoters for the production of laminates of a very wide range of materials, having improved material and processing properties.

Surprisingly it was found that silane-modified partially crystalline polyolefins with special material properties as one-component systems are particularly suitable as adhesion promoters for the production of laminates. In particular silane-modified partially crystalline polyolefins with a high degree of functionalization, a high softening point (in the non-crosslinked state) and high tensile strength have proved particularly suitable for these applications.

Accordingly, a first subject matter of the present invention is the use of partially crystalline polyolefins modified with one or more silanes as adhesion promoters for the production of flat glass/glass, glass/plastic or plastic/plastic laminates. Laminates in the context of the present invention are understood to mean all systems that are composed of individual layers of flat articles.

Compared to the systems described in the prior art, the use of silane-modified polyolefins has a number of advantages. Thus, no additional temperature, radiation and/or UV hardening is necessary, which also enables materials with low transmission values to be processed. Likewise no further special adhesion promoter (neither for the glass nor for the plastics surfaces) is necessary and application is possible simply from solution or by means of a melt. Due to the direct application of the melt no solvent has to be evaporated, compared to the application of aqueous systems (e.g. dispersions and/or latices). At the same time, on account of the specific material properties low processing temperatures of in some cases significantly below 160° C. can nevertheless be achieved, so that temperature-sensitive materials too can be processed. This reduces the processing costs of the manufacturer of the corresponding composite materials. Furthermore, the silane-modified polyolefins have good diffusion barrier properties, which are improved still further by the crosslinking that occurs. Accordingly no additional barrier material is required, since the adhesive layer itself acts as a barrier. Moisture penetrating the laminate leads to a type of "self healing", so that the barrier effect is further improved by increasing the crosslinking density. A further advantage is the fact that it is possible with the aforementioned systems to produce composite materials of non-polar and/or polar and non-polar materials, which is difficult or even impossible with the adhesion promoters described in the prior art. An additional surface treatment of glass and/or plastics surfaces (e.g. by plasma or corona treatment) can be omitted. Furthermore flexurally elastic systems according to the invention can be produced, since despite a crosslinking the elasticity of the system is retained, and depending on the chosen silane-modified partially crystalline polyolefin is even raised. The silane functions of the silane-modified polyolefins permit a strong (chemical) bonding of the polyolefins to the surfaces, in particular glass surfaces, without requiring an additional process step. In contrast to urethane adhesives the silane-modified polyolefins are also toxicologically harmless, since they are free of isocyanate, and are thus suitable for a far broader range of applications.

The essence of the present invention is the use of polyolefins modified with one or more silanes as adhesion promoters for the production of flat glass/glass, glass/plastic or plastic/plastic laminates. Preferably the glass/glass, glass/plastic or plastic/plastic laminates are flexible. The specially chosen adhesion promoter enables the flexibility of the laminates to be retained, since these, even after crosslinking, are elastic. In particular it is possible by means of the modified polyolefins according to the invention to produce flexible laminates using very thin glass "disks", which despite their very small layer thickness are not destroyed and/or damaged under a bending stress. This is achieved inter alia by the fact that the polymers used according to the invention themselves form a very effective water vapor and gas barrier, which is reinforced further by moisture crosslinking (for example also by penetration of moisture into the laminate). The layer thickness of the employed glass layer can thus turn out to be significantly less, which reduces the weight of the corresponding structural parts. In addition the thinner glass layers have a significantly improved flexural elasticity, especially if they are joined in an interlocking manner with a likewise flexurally elastic polymer layer (for example a polymer film). A further advantage of the polymers used according to the invention is that they can simultaneously also serve as adhesion promoters for functional coatings of glass and/or plastic surface(s), so that an additional surface treatment (e.g. by etching, corona, plasma, etc.) can be omitted.

The polyolefin is according to the invention a homopolymer, copolymer or terpolymer of at most 25 wt. %, preferably 1 to 22 wt. %, particularly preferably 2 to 20 wt. % and especially preferably of 3 to 18 wt. % ethene, at most 95 wt. %, preferably 1 to 85 wt. %, particularly preferably 5 to 78 wt. % and especially preferably 10 to 75 wt. % propene, and/or 5 to 100 wt. %, preferably 7 to 98 wt. %, particularly preferably 10 to 95 wt. % and especially preferably 12 to 90 wt. % of an olefin with 4-10 carbon atoms. Particularly preferably the polyolefins according to the invention are selected from poly(1-butene), poly(propylene), poly(propylene-co-ethylene), poly(propylene-co-1-butene), poly(ethylene-co-1-butene) and poly(ethylene-co-propylene-co-1-butene). Furthermore the polyolefins are preferably partially crystalline, and are thus in particular partially crystalline poly-alpha-olefins.

Highly crystalline polyolefins have a high degree of order with regard to the microstructure of the polymer chains, and are characterized by a high melt enthalpy as well as by high melting points. Thus, for example, for 100% isotactic polypropylene the calculated melting point is 185° C. and the melt enthalpy is ca. 207 J/g (J. Bicerano; J. M. S.; Rev. Macromol. Chem. Phys.; C38 (1998); 391ff). Being a homopolymer it also has a relatively low low-temperature resistance as well as a high brittleness and a poor heat sealability and weldability. The tensile strength (fracture) is ca. 30 MPa, which is the same as if there were no elongation at break (H.-G. Elias; Makromoleküle, Vol. III; Wiley-VCH; Weinheim; 2001). The proportion of xylene-soluble constituents is in the case of isotactic poly(propylene) homopolymer that has been obtained by metallocene catalysis, normally significantly <1 ma %, and in the case of random copolymers with ethylene, xylene-soluble fractions of at most 5 ma % are found depending on the ethylene proportion (W. Spaleck in: "Metallocene based Polyolefins"; J. Scheirs, W. Kaminsky (Eds.); J. Wiley & Sons; Weinheim; 1999).

Non-crystalline, completely amorphous polyolefins on the other hand do not exhibit a melting point but have a softening range, and in the extreme case do not exhibit a detectable melt enthalpy. Thus, for example, atactic polypropylene has a low softening point, a low density and a good solubility in inorganic solvents. Conventional atactic polypropylene (aPP) is characterized by a very broad molecular weight distribution, which on the one hand leads to a broad melting range and on the other hand is accompanied by large low molecular weight fractions, which have a more or less marked tendency to undergo migration. aPP has a very low tensile strength of circa 1 MPa, but on the other hand has a very high elongation at break of up to 2000% (H.-G. Elias; Makromoleküle, Vol. III; Wiley-VCH; Weinheim; 2001).

Partially crystalline polyolefins, in particular partially crystalline polyolefins according to the present invention, lie between these extremes. In particular partially crystalline polyolefins according to the present invention are characterized by the fact that at the first and/or second heating in differential calorimetry (DSC) they preferably exhibit at least one melting peak as well as a characteristic melt enthalpy that is never higher than 50%, preferably never higher than 40%, particularly preferably never higher than 30%, and especially preferably never higher than 25% of the theoretically calculated value for pure isotactic polypropylene (J. Bicerano; J. M. S.; Rev. Macromol. Chem. Phys.; C38 (1998); 391ff).

The olefin with 4 to 10 carbon atoms can in a special embodiment be selected from the group comprising 1-butene, 1-pentene, 1-hexene, 1-octene, 1-decene, 3-methyl-1-butene, 3-methyl-1-hexene, 3-methyl-1-heptene, 4-methyl-1-pentene and/or 6-methyl-1-heptene. Preferably the alpha-olefin with 4 to 10 carbon atoms is selected from the group comprising 1-butene, 1-hexene and/or 1-octene. The production of the copolymers and/or terpolymers is carried out by polymerizing the aforementioned monomers in the specified amounts.

The polymers according to the invention can be obtained for example by polymerizing propylene with ethylene and/or 1-butene and/or further alpha-olefins with 4 to 10 carbon atoms using a $TiCl_3$ $(AlCl_3)_n$ mixed catalyst (n=0.2 to 0.5), wherein a trialkylaluminum compound is used as co-catalyst. The monomer ethene is used in the gaseous state, while the monomers propene and 1-butene can be used in the gaseous state and also in the liquid state. Gaseous hydrogen can for example be used as molecular weight regulator. The polymerization is preferably carried out in an inert solvent, which is selected for example from the group of aliphatic hydrocarbons. A polymerization in the proposed monomer is also possible. The reaction temperature is between 30 and 200° C. The polymers according to the invention can, corresponding to the prior art, be chemically stabilized either in the form of their reaction solution or at a later time, in order to protect them against harmful influences, e.g. from solar radiation, atmospheric humidity and oxygen. In this connection stabilizers that contain hindered amines (HALS stabilizers), hindered phenols, phosphites and/or aromatic amines can for example be used, in particular esters of pentaerythritol, such as for example tetrakis(methylene-3,5-ditertbutyl-4-hydroxyhydrocinnamate)methane (tradename IRGANOX 1010) and/or 2,4,8,10,tetraoxa-3,9-diphosphaspiro-3,9,bisoctadecyloxy[5,5]undecane (tradename: WESTON 618). Particularly preferably only those stabilizers are used that contain only one hydrolytically active terminal group. The effective amount of stabilizers is in this connection in the range from 0.1 to 2 wt. %, referred to the polymers.

The aforementioned copolymers and/or terpolymers are modified with one or more silanes, and in particular the silanes are grafted onto the copolymer and/or terpolymer.

The silane to be grafted on preferably has olefinic double bonds as well as 1 to 3 alkoxy groups directly bonded to the silicon atom. In particular the one or more silanes is/are selected from the group comprising vinyltrimethoxysilane (VTMO), vinyltriethoxysilane, vinyl-tris(2-methoxyethoxy)silane, 3-methacryloypropyltrimethoxysilane (MEMO; $H_2C=C(CH_3)COO(CH_2)_3—Si(OCH_3)_3$), 3-methacryloxypropyltriethoxysilane, vinyldimethylmethoxysilane and/or vinylmethyldibutoxysilane. Most particularly preferred is the silane vinyltrimethoxysilane.

The one or more silanes can be grafted onto the base polymer according to all methods known in the prior art, for example in solution or preferably in the melt, a radical donor being used in sufficient amount. A suitable procedure is described in DE-OS 40 00 695, to which reference is expressly made. For example the following radical donors can be used: diacyl peroxides, such as for example dilauryl peroxide or didecanoyl peroxide, alkyl peresters, such as for example tert-butylperoxy-2-ethylhexanoate, perketals, such as for example 1,1-di(tert-butylperoxy)-3,3,5-trimethylcyclohexane or 1,1-di(tert-butylperoxy)-cyclohexane, dialkyl peroxides, such as for example tert-butylcumyl peroxide, di(tert-butyl)-peroxide or dicumyl peroxide, C-radical donors such as for example 3,4-dimethyl-3,4-diphenylhexane or 2,3-dimethyl-2,3-diphenylbutane and also azo compounds such as for example azobisisobutyronitrile, 2,2'-azo-di(2-acetoxypropane), etc.

In a special embodiment a solution process is employed, in which aliphatic and/or aromatic hydrocarbons as well as cyclic ethers can be used as solvent. Particularly preferably at least one aromatic hydrocarbon is used as solvent. Suitable aromatic hydrocarbons are in particular trichlorobenzene, dichlorobenzene, toluene and xylene, xylene being particularly preferably used. Especially preferred aliphatic hydrocarbons are for example propane, n-butane, hexane, heptane, cyclohexane and octane. A particularly preferred cyclic ether is tetrahydrofuran (THF).

If ethers, in particular cyclic ethers, are used as solvent, then the employed initiator as well as the process parameters (e.g. temperature, pressure, residence times, etc.) must be chosen with particular care in order to suppress and/or control the formation of explosive peroxides of the employed ethers. In particular the additional use of special inhibitors (e.g. IONOL) should be considered.

In the case of a graft process in solution the concentration of the employed base polymer is at least 10 ma %, preferably at least 15 ma %, particularly preferably at least 20 ma % and especially preferably at least 22.5 ma %. The reaction temperature of the graft process in solution is 30 to 200° C., preferably 40 to 190° C., particularly preferably 50 to 180° C. and especially preferably 55 to 140° C. The solution grafting is carried either in a discontinuous or in a continuous manner. In the case of a discontinuous procedure the solid polymer (e.g. as granules, powder, pellets etc.) is first of all dissolved in the employed solvent. Alternatively, a conditioned polymerization solution from the production process of the base polymer is used directly, and is brought to the reaction temperature. This is followed by the addition of the monomer/monomers and the radical starter(s). In a particularly preferred embodiment solvent, base polymer(s) and monomer(s) are taken first of all and brought to the reaction temperature, while the radical starter(s) is/are continuously metered in over a specified period. This has the advantage that the stationary radical concentration is low, and therefore the ratio of graft reaction to chain splitting is particularly favorable (i.e. more graft reaction and less chain splitting). In a further particularly preferred embodiment solvent and base polymer(s) are first of all taken and brought to the reaction temperature, while monomer(s) and radical starters—jointly or separately from one another—are continuously metered in over a specified period. This has the advantage that the stationary radical concentration as well as the monomer concentration at the reaction site are low, which suppresses the chain splitting as well as the formation of homopolymers. This is important particularly when using monomers that at the reaction temperature have a strong tendency to undergo thermally initiated (homo)polymerization. Most particularly preferably a further amount of radical starter(s) is/are metered in following the different defined metering periods, in order to minimize the content of residual monomers in the reaction solution. A stirred vessel is preferably used as reactor, though the use of alternative reaction vessels, such as for example discontinuous kneading reactors, is also possible, and is especially preferred at low reaction temperatures and/or high polymer concentrations.

In the case of a continuous reaction the solid polymer is first of all dissolved in at least one solvent in one or more receiving vessels (e.g. stirred vessels) and is then continuously metered into the reaction vessel(s). In an alternative, likewise particularly preferred embodiment, a conditioned polymer solution from a production process of the base polymer is directly used. In a further likewise particularly preferred embodiment the solid polymer (e.g. in the form of powder, granules, pellets, etc.) is continuously metered together with at least one solvent into a (single-shaft or multi-shaft) screw machine or a continuous kneader, dissolved under the action of heat and/or shear forces, and then continuously metered into the reaction vessel(s). Suitable reaction vessels or reactors for the execution of the continuous grafting reaction in solution are continuous stirred vessels, stirred vessel cascades, flow tubes, flow tubes with forced conveyance (e.g. screw machines), reaction kneaders as well as arbitrary combinations thereof. If flow tubes with forced conveyance are used, then these are preferably extruders, in which connection single-shaft, twin-shaft as well as multi-shaft extruders can be used. Multi-shaft extruders are particularly preferably used. For the continuous production of the modified polymers according to the invention in solution it is especially preferred to use a reactor combination consisting of a flow tube, flow tube with forced conveyance and a continuous stirred vessel, wherein also the removal of residual monomers and volatile byproducts/decomposition products preferably takes place either in the flow tube with forced conveyance or in the continuous stirred vessel.

Alternatively a melt process is preferably used, in which at least one radical starter is metered directly into the melt. Especially with this process variant the temperature of the polymer composition at the time the at least one radical starter is metered in lies above the SADT (self-accelerating decomposition temperature—temperature above which a self-accelerating decomposition can occur) of at least one of the metered-in radical starters. The reaction temperature of the graft process in the melt is 160 to 250° C., preferably 165 to 240° C., particularly preferably 168 to 235° C. and especially preferably 170 to 230° C. The melt grafting takes place either in a discontinuous or a continuous manner. In the case of a discontinuous procedure the solid polymer (e.g. as granules, powder, pellets, etc.) is first of all melted and if necessary homogenized. Alternatively, a conditioned polymer melt from a polymerization process is used directly and brought to the reaction temperature. This is followed by the addition of monomer(s) and radical starter(s).

In a special embodiment monomer(s) and polymer melt are homogenously thoroughly mixed and brought to the reaction temperature, while the radical starter(s) are continuously metered in over a specified period. This has the advantage that the stationary radical concentration is low, and therefore the ratio of graft reaction to chain splitting is particularly favorable (i.e. more graft reaction and less chain splitting).

In a further particularly preferred embodiment the polymer melt is first of all taken and homogenized, while monomer(s) and radical starters—jointly or separately—are continuously metered in over a specified period. This has the advantage that the stationary radical concentration as well as the monomer concentration at the reaction site remains low, which suppresses chain splitting as well as the formation of homopolymers. The latter is particularly important when using monomers that have a tendency to undergo thermal (homo)polymerization at the prevailing reaction temperature. A stirred vessel with wall-accessible stirring unit or a reaction kneader is preferably used as reactor.

In the case of a continuous reaction the solid polymer is first of all melted in one or more receiving vessels (e.g. stirred vessels) and is then continuously metered into the reaction vessel or vessels. In an alternative, likewise particularly preferred embodiment, a conditioned polymer melt from a polymerization process is directly used. In a further likewise particularly preferred embodiment the solid polymer (e.g. in the form of powder, granules, pellets, etc.) is continuously metered into a (single-shaft or multi-shaft) screw machine or a continuous kneader, melted under the action of heat and/or shear forces, and then continuously metered into the reaction vessel(s). Suitable reaction vessels or reactors for carrying out the continuous graft reaction in the melt are continuous stirred vessels, stirred vessel cascades, flow tubes, flow tubes with forced conveyance (e.g. screw machines), reaction kneaders, as well as arbitrary combinations thereof. If flow tubes with forced conveyance are used, then these are preferably extruders, in which case single-shaft, double-shaft as well as multi-shaft extruders can be used. Multi-shaft extruders are particularly preferably used. It is especially preferred for the continuous production of the modified polymers according to the invention in the melt to use a reactor combination of flow tube, flow tube with forced conveyance and a continuous stirred vessel, wherein also the removal of residual monomers and volatile byproducts/decomposition products preferably takes place either in the flow tube with forced conveyance or in the continuous stirred vessel.

The non-crosslinked polyolefins that are used are characterized in that the melt viscosity measured by oscillation rheometry at 1 Hz and a deformation of at most 1% at 190° C. is 1,000-150,000 mPa·s, preferably 1,500-145,000 mPa·s, particularly preferably 2,000 to 125,000 mPa·s and especially preferably 2,500 to 100,000 mPa·s, further preferred ranges being between 2,500 and 10,000 mPa·s, between 5,000 and 25,000 mPa·s, between 10,000 and 45,000 mPa·s and between 40,000 and 80,000 mPa·s.

The softening point of the non-crosslinked polyolefin, measured by means of the ring & ball method, is 80°-170° C., preferably 85 to 168° C., particularly preferably 87 to 165° C. and especially preferably 90 to 162° C., further preferred ranges lying between 90 and 115° C., between 110 and 135° C. and between 120 and 155° C. In a special embodiment, especially if poly(propylene) homopolymer and/or polypropylene copolymer/terpolymer with a comonomer fraction of <10 ma % are used as polymer, then the softening point of the employed polyolefins as measured by the ring & ball method is between 120 and 170° C., preferably between 125 and 168° C., particularly preferably between 130 and 165° C. and especially preferably between 140 and 160° C. In a further special embodiment, especially if poly(1-butene) homopolymer and/or poly(1-butene) copolymer/terpolymer with a comonomer fraction of <10 ma % are used as polymers, the softening point of the suitable polyolefins measured by the ring & ball method is between 90 and 140° C., preferably between 95 and 135° C., particularly preferably between 100 and 130° C. and especially preferably between 105 and 128° C.

The needle penetration of the non-crosslinked polyolefins is between 1 and 50×0.1 mm, preferably between 3 and 45×0.1 mm, particularly preferably between 5 and 40×0.1 mm, further preferred ranges being between 3 and 12×0.1 mm, between 10 and 25×0.1 mm, between 15 and 35×0.1 mm and between 20 and 40×0.1 mm. In a special embodiment, particularly if poly(propylene) homopolymer, poly(1-butene) homopolymer, polypropylene copolymers/terpolymers and/or poly(1-butene)copolymers/terpolymers with a comonomer fraction of <10 ma % are used as polymers, the needle penetration of the polyolefins is at most 16×0.1 mm, preferably at most 14×0.1 mm, particularly preferably at most 12×0.1 mm and especially preferably between 1 and 10×0.1 mm. In a further special embodiment, particularly if poly(1-butene) copolymers/terpolymers and/or poly(1-butene) copolymers/terpolymers with a comonomer fraction of >30 ma % are used as polymers, the needle penetration of the polyolefins that can be used is at least 15×0.1 mm, preferably at least 17×0.1 mm, particularly preferably at least 19×0.1 mm and especially preferably 20 to 45×0.1 mm.

The glass transition temperature of the non-crosslinked polyolefins measured by means of DSC (differential calorimetry) at the second heating is between −5 and −65° C., preferably between −7 and −62° C., particularly preferably between −8 and −60° C. and especially preferably between −10 and −58° C., further preferred ranges being between −10 and −28° C., between −25 and −45° C. and between −32 and −50° C. In a special embodiment, particularly if poly(propylene) homopolymer and/or polypropylene copolymers/terpolymers with a comonomer fraction of <10 ma % are used as polymers, the glass transition temperature of the non-crosslinked polyolefins determined by means of DSC (differential calorimetry) in the second heating is between 0 and −15° C. preferably between −2 and −4° C. and especially preferably between −5 and −13° C. In a further special embodiment, particularly if poly(1-butene) homopolymer and/or poly(1-butene) copolymers/terpolymers with a comonomer fraction of <10 ma % are used as polymers, the glass transition temperature of the non-crosslinked polyolefins determined by means of DSC (differential calorimetry) in the second heating is between −20 and −48° C., preferably between −22 and −46° C. and particularly preferably between −25 and −45° C. In a further special embodiment, particularly if 1-octene is used as comonomer, the glass transition temperature of the non-crosslinked polyolefins determined by means of DSC (differential calorimetry) in the second heating is at most −35° C., preferably at most −40° C., particularly preferably at most −45° C. and especially particularly preferably less than −48° C.

The melt enthalpy of the non-crosslinked polyolefins determined by means of DSC (differential calorimetry) in the second heating is at most 30 J/g, preferably between 1 and 28 J/g, particularly preferably between 2 and 25 J/g and especially preferably between 3 and 23 J/g, further preferred ranges lying between 3 and 9 J/g, between 5 and 15 J/g and between 12 and 21 J/g.

The solubility of the non-crosslinked polyolefins in xylene at room temperature is at least 55 ma %, preferably at least 60 ma %, particularly preferably at least 65 ma % and especially preferably between 68 and 99.9 ma %, further preferred ranges being between 70 and 85 ma %, between 80 and 95 ma % and between 85 and 99 ma %. In a special embodiment, particularly if the melt enthalpy of the non-crosslinked polyolefins determined by means of DSC (differential calorimetry) in the second heating is less than 2 J/g, the solubility of the employed polyolefins in xylene at room temperature is more than 98 ma %, preferably more than 99 ma % and especially 100 ma %, i.e. the polymers are completely soluble.

The solubility of the non-crosslinked polyolefins in tetrahydrofuran at room temperature is at least 10 ma %, preferably at least 12 ma %, particularly preferably at least 14 ma % and especially preferably 15 to 100 ma %, further preferred ranges lying between 15 and 35 ma %, between 30 and 65 ma %, between 50 and 85 ma % and between 80 and 99 ma %. In a special embodiment, particularly if the softening point of the employed polyolefins determined by the ring & ball method is >150° C., the solubility of the polymers in tetrahydrofuran at room temperature is preferably at most 70 ma %. In a further particularly preferred embodiment, especially if the employed polyolefin has a propylene fraction of at least 50 ma % and are most 80 ma %, the solubility of the polymers in tetrahydrofuran at room temperature is preferably at least 70 ma %. In a further special embodiment, particularly if poly(1-butene) homopolymer and/or poly(1-butene) copolymers/terpolymers with a comonomer fraction of <10 ma % are used as polymers, the solubility of the polymers in tetrahydrofuran at room temperature is at most 50 ma %, preferably at most 45 ma %, particularly preferably at most 40 ma % and especially preferably between 5 and 38 ma %.

The polyolefins according to the invention (after complete separation from unreacted residual monomer) have a silicon content determined by XFS spectroscopy (x-ray fluorescence spectroscopy) of at least 0.3 ma %, preferably at least 0.35 ma %, particularly preferably at least 0.4 ma % and especially preferably of 0.45-2 ma %, further preferred ranges lying between 0.5 and 0.75 ma %, between 0.7 and 0.95 ma %, between 0.8 and 1.25 ma % and between 1.1 and 2 ma %.

A further subject matter of the present invention are laminates comprising at least one flat glass body, which has at least on one side a flat glass and/or plastic body applied thereto, wherein an intermediate layer of one or more polyolefins modified with one or more silanes is present as adhesion promoter between the glass body and the flat glass and/or plastic body mounted thereon and/or is present between the plastic body and optionally one or more further plastic bodies.

Alternative laminates according to the invention comprise at least one flat plastic body of a first plastic, which has at least on one side at least one further flat plastic body of the same plastic or of a plastic different from the first plastic, wherein an intermediate layer of one or more polyolefins modified with one or more silanes is present as adhesion promoter between the plastic body of the first plastic and the further plastic body.

In order to obtain a flexible laminate, the glass and/or plastic bodies are preferably flexible glass or plastic bodies.

The glass or plastic bodies of the laminates according to the invention are flat, i.e. the spatial extension of the bodies in one spatial direction is greater than in the other. In particular the flat bodies are corresponding sheets, layers, films and/or disks.

The thickness of the glass and/or plastic bodies is at most 8 mm, preferably at most 6 mm, particularly preferably at most 4 mm and especially preferably at most 2 mm, further preferred ranges being between 0.9 and 1.9 mm, 0.2 to 1.0 mm, 0.01 to 0.5 mm and 0.001 to 0.05 mm.

The silane-modified polyolefins contained in the laminates have already been described before. The thickness of the intermediate layer of one or more polyolefins modified with one or more silanes is at most 6.5 mm, preferably at most 4 mm, particularly preferably at most 2 mm and especially preferably at most 1 mm, further preferred ranges being between 0.55 and 1.25 mm, between 0.1 and 0.75 mm, between 0.01 and 0.2 mm, between 0.005 and 0.015 mm and between 0.001 and 0.005 mm.

The intermediate layer is preferably thinner than the glass and/or plastic body to which it is applied. In particular the ratio of the thickness of the glass and/or plastic body to the layer thickness of the intermediate layer is at most 1:0.75, preferably at most 1:0.5, particularly preferably at most 1:0.1 and especially preferably at most 1:0.01.

In principle all types of glasses known to the person skilled in the art are suitable as glass bodies, for example flat glass, float glass, rolled glass (sometimes also termed cast glass), drawn glass, A glass (alkali-containing), E glass (electrically insulating), C glass (chemically resistant), S glass (high-strength glass), R glass (high-strength glass), HM glass, AR glass (alkali-resistant glass), phosphate glass and/or quartz glass. The glass is preferably a sodium float glass and/or borosilicate glass, which is preferably used for the production of displays. In particular glasses with a surface treatment (for example based on metal oxides) can also be used, especially with a surface treatment in which a chemical ion exchange takes place (for example sodium for potassium ions in so-called sodium lime silica glass).

The plastic of the plastic body can be selected from polypropylene (e.g. isotactic or syndiotactic), poly(1-butene) e.g. isotactic or syndiotactic), polyethylene (e.g. HDPE, LDPE, LLDPE, etc.), copolymers of cycloolefins and 1-olefins (e.g. dicyclopentadiene and/or norbornene and ethylene), poly(3-methyl-1-butene), poly(3-methyl-1-pentene), poly(methyl methacrylate), polyalkylmethacrylate copolymers, polycarbonate, polystyrene, poly(vinyl acetate), cellulose acetate, poly(ether sulfone), poly(ether ketone), (co)polyesters (such as for example poly(ethylene terephthalate)) and (co)polyamides, wherein depending on the desired application clear, light-permeable plastics as well as transparent, colored plastics, or also opaque and/or light-impermeable colorless and/or colored plastics can be used. In a special embodiment the permeability of the employed plastic body depends on the observation angle of the observer. In a further special embodiment printed and/or coated flat plastic bodies, especially plastic films, are used. Preferably transparent plastic bodies are used. In particular the plastic is selected from polypropylene, polyethylene, poly(ethylene-co-norbonene), poly(methyl methacrylate), polycarbonate and poly(propylene) copolymers.

In a further embodiment of the present invention further layers may be present on the laminates. These can be present on one or both sides of the laminates. The additional layers can for example be layers with liquid crystal orientability, polarization layers (e.g. to produce monochromatic light), layers that absorb and/or scatter certain light wavelengths, anti-reflection layers, sol-gel layers and/or other forms of surface treatment and/or surface coatings, which can be used for example for anti-reflection purposes, hardening, to impart a satin finish, (chemical and/or corrosive) passivation and/or for producing an electrical conductivity, an electroluminescence or a phosphorescence of the corresponding layer(s). The nature and number of the aforementioned additional layers is in principle not limited, in other words a plurality of the aforementioned layers can also be applied to the laminates. Examples of the application of layers that are suitable for producing an electrical conductivity within the laminate composite are for example those layers containing calcium, aluminum, silicon, barium, ruthenium, magnesium-silver alloys, indium-tin oxide (ITO), poly(3,4-ethylenedioxythiophene)/polystyrene sulfonate mixtures, aluminum tris(8-hydroxyquinoline), poly(paraphenylene-vinylidene), poly(hydroxyamide ethers), lithium fluoride, cesium fluoride and/or silver. The further layers can also contain flexible ceramic layers, for example ceramic membranes.

In a further special embodiment the glass and/or plastic laminate according to the invention can also contain thin metallic layers, in particular those based on transition metals, non-ferrous metals and/or noble metals. These can be applied via a coating technology (e.g. PVD or CVD technique) and can also be present in the form of a film. In particular the metals are chosen from gold, silver, platinum, palladium, copper, nickel, cobalt, zinc, iron, chromium, molybdenum, tungsten, vanadium, titanium, zirconium, aluminum, silicon, germanium, tin, lead and/or their alloys. The use of doped metal layers is also possible. Most particularly preferred are the metals copper, aluminum, silicon, germanium, iron and/or their alloys.

A further subject matter of the present invention are methods for the production of the laminates according to the invention, wherein an intermediate layer of one or more polyolefins modified with one or more silanes is applied as adhesion promoter to at least one side of at least one flat glass body, and at least one flat glass or plastic body is then applied to the at least one intermediate layer.

In order to produce the alternative laminates according to the invention an intermediate layer of one or more polyolefins modified with one or more silanes is applied as adhesion promoter to at least one side of at least one flat plastic body of a first plastic, and a further flat plastic body of the same plastic or a plastic different from the first plastic is then applied to the intermediate layer.

The aforementioned intermediate layer, which according to the invention acts as adhesion promoter, can be applied in the form of a solution or a melt. The application of the intermediate layer can in this connection be carried out in all ways known to the person skilled in the art, for example by spray application, spincoating, knife application, roller application and/or by printing techniques.

If the application is carried out in the form of a solution then cyclic and/or linear aliphatic and/or aromatic hydrocarbons with or without heteroatoms, as well as corresponding halogenated hydrocarbons, can be used as solvent. Preferably however no halogenated hydrocarbons are used. Xylene is particularly preferably used. In the corresponding solution the aforementioned hydrocarbons are preferably present in an amount of at most 90 ma %, preferably at most 80 ma %, particularly preferably at most 75 ma % and especially preferably at most 50 ma %. If the intermediate layer is applied in the form of a solution, then the application is carried out at temperatures from 0° C. up to a temperature that is 10° C. below the boiling point of the solvent, preferably at a temperature of 0 to 80° C.

Most particularly preferably the application takes place from the melt. The application of the modified polyolefin takes place as pure substance or in the form of the formulations specified above in the form of a melt at temperatures between 50° C. and 300° C., preferably between 100° C. and 285° C., particularly preferably between 130° C. and 260° C. and especially preferably between 140° C. and 250° C. In a further most particularly preferred embodiment the melt application of at least one polyolefin according to the invention takes place in the form of a supercooled melt, this application being particularly suitable for temperature-sensitive substrates. The application temperature in this case is 70-170° C., preferably 75-165° C., particularly preferably 80-160° C. and especially preferably 85-155° C. A covering/blanket of protective gas (e.g. nitrogen, argon, etc.) is recommended during the heating and/or melting in order to prevent the formation of gel particles on the surface. A very wide range of application techniques, such as for example roller application, slot die application, knife application, point application, multiline application, rototherm application, spray application in the swirling process, by spincoating or over a wide area with melt blow and/or air assisted spray processes, can be used for this purpose. When using modified polymers in the spray application technique it is particularly preferred to use protective gases (e.g. nitrogen, argon, etc.) as spray medium. The substrates are then joined together within the so-called "open time" ("open time"=time interval in which the parts to be bonded can be joined to one another), the duration of which depends on the composition of the applied mixture.

In a special embodiment at least one of the modified polyolefins is used in the form of a polymer film for the construction of the laminates according to the invention. In this case the polymer film can consist either exclusively but also proportionally of the modified polyolefins, and/or can be coated with these. Particularly preferably such polymer films are activated thermally (e.g. using infrared and/or microwave radiation) in order to ensure a strong composite.

Furthermore the polyolefins in the aforementioned applications can be present as a formulation. Corresponding formulations contain in particular constituents that are necessary in order to achieve special properties, such as for example forming and shaping ability, adhesion capacity, processability, crosslinking rate, crosslinking density, (melt and/or solution) viscosity, strength, crystallization rate, tackiness, storage stability, etc. The proportion of the further constituents is in a special embodiment of the present invention preferably at most 10 ma %, particularly preferably <7.5 ma % and most particularly preferably <5 ma %. This has the advantage that the material properties of the formulation are substantially the same as those of the polymer used according to the invention. Such a formulation can be prepared with very little effort and expenditure.

Alternatively, in a further embodiment of the present invention the proportion of the further constituents is >10 ma %. In this case the further constituents make up at most 80 ma % of the total formulation, preferably at most 60 ma %, particularly preferably at most 50 ma % and especially preferably at most 40 ma %.

The further constituents can be crosslinking accelerators, in particular silanol condensation catalysts, inorganic and/or organic fillers, which can be electrically conducting or insulating as desired, inorganic and/or organic pigments, which can be electrically conducting or insulating as desired, synthetic and/or natural resins, in particular adhesive resins, synthetic and/or natural oils, inorganic and/or organic, synthetic and/or natural polymers, which can be electrically conducting or insulating as desired, inorganic and/or organic synthetic and/or natural fibers, which can be electrically conducting or insulating as desired, inorganic and/or organic stabilizers and/or inorganic and/or organic flame proofing agents.

In particular the further constituents include resins, wherein the resins are used in order to match certain properties of the adhesive layer, in particular the tackiness and/or adhesion, the flow behavior or creep behavior of the adhesive layer and/or the adhesive viscosity, to specific requirements. In this case the further constituents can be natural resins and/or synthetic resins. In the case of natural resins these natural resins contain abietic acid (e.g. colophony) as main constituent. In addition the resins can be terpene or polyterpene resins, petroleum resins and/or coumarone-indene resins, especially so-called $C_5$ resins and/or $C_9$ resins and/or copolymers of $C_5/C_9$ resins. The proportion of the resins in the formulation according to the invention is in particular at most 45 ma %, preferably between 1 and 40 ma %, particularly preferably between 2 and 30 ma % and especially preferably between 3 and 20 ma %, referred to the total formulation.

Furthermore the formulations according to the invention can contain conventional amorphous (or partially crystalline) poly(α-olefins) (so-called APAOS) as further constituents. The aforementioned amorphous poly(α-olefins) can be homopolymers/copolymers and/or terpolymers of ethylene, propylene, 1-butene or linear and/or branched 1-olefins with 5-20 carbon atoms, which can be obtained for example by conventional Ziegler-Natta catalysis or metallocene catalysis. The proportion of the amorphous (or partially crystalline) poly(α-olefins) is in particular at most 50 ma %, preferably at most 40 ma % and particularly preferably at most 30 ma %, referred to the total formulation. Preferably the further constituents are crystalline or partially crystalline polyolefins, which can be obtained for example by conventional Ziegler-Natta catalysis and/or by metallocene catalysis, which in particular contain isotactic polypropylene, syndiotactic polypropylene, polyethylene (HDPE, LDPE and/or LLDPE), isotactic poly(1-butene), syndiotactic poly (1-butene), their copolymers and/or their copolymers with linear and/or branched 1-olefins with 5 to 10 carbon atoms. Furthermore it is preferred if the crystalline or partially crystalline polymers are chemically modified polyolefins, in which the chemical modification includes in particular modification effected by maleic anhydride, itaconic anhydride, acrylic acid, acrylates, methacrylates, unsaturated epoxy compounds, silane acrylates, silanes and hydroxyalkylsilanes.

In addition the further constituents may include polymers with polar groups. Polymers with polar groups include polystyrene copolymers (e.g. with maleic anhydride, acrylonitrile, etc.), polyacrylates, polymethacrylates, (co)polyesters, polyurethanes, (co)polyamides, polyether ketones, polyacrylic acid, polycarbonates as well as chemically modified polyolefins (such as for example poly(propylene graft maleic anhydride) or poly(propylene graft alkoxyvinyl silane). In this case, when the polymers according to the invention are mixed with the polymers containing polar groups there may be an immediate and/or delayed reactive joining of the polymer chains, which preferably leads to an improved compatibility between the two polymer phases, which can be detected for example in a shift of the glass transition temperatures of the employed polymers. Particularly preferably the reactive joining causes the polymer phases to have a common glass transition temperature, i.e. exhibit a macroscropic miscibility.

Furthermore the further constituents can include homopolymers and/or copolymers (or also oligomers) based on ethylene, propylene, acrylonitrile, a diene and/or a cyclic diene, butadiene, styrene and/or isoprene, and in particular these polymers are block copolymers, especially rubbers such as for example natural and synthetic rubber, poly (butadiene), poly(isoprene), styrene-butadiene rubber and nitrile rubber. The proportion of the polymers based on buta-diene, styrene and/or isoprene is at most 20 ma %, preferably 1-15 ma %, particularly preferably 1.5-10 ma % and especially 2-9 ma %, referred to the formulations. The oligomers are preferably butadiene oligomers.

Furthermore the further constituents can include elastomeric polymers based on ethylene, propylene, a diene and/or cis,cis-1,5-cyclooctadiene, exo-dicyclopentadiene, endo-dicyclopentadiene, 1,4-hexa-diene and 5-ethylidene-2-norbornene, and especially in this case ethylene-propylene rubber, EPM (free of double bonds, ethylene content 40-75 ma %) and/or EPDM. The proportion of the polymers based on ethylene, propylene, a diene and/or cis,cis-1,5-cyclooctadiene, exo-dicyclopentadiene, endo-dicyclopentadiene, 1,4-hexadiene and 5-ethylidene-2-norbornene is normally at most 20 ma %, preferably 1-15 ma %, particularly preferably 1.5-10 ma % and especially 2-9 ma %, referred to the formulations.

Alternatively or by way of amplification the further constituents may include waxes, in particular modified and unmodified waxes, these preferably being crystalline, partially crystalline and/or amorphous polyolefin waxes based on polyethylene, polypropylene and/or poly(1-butene), paraffin waxes, metallocene waxes, microwaxes, polyamide waxes, polytetrafluoroethylene waxes and/or Fischer-Tropsch waxes. The proportion of the waxes is at most 50 ma %, preferably 1-40 ma %, particularly preferably 2-30 ma % and especially preferably 3-20 ma %, referred to the formulations.

In addition the further constituents may include fillers, the fillers being used in order to match special property profiles of the adhesive layer, such as for example the temperature application range, the strength, the shrinkage, the electric conductivity, the magnetism and/or the thermal conductivity, in a targeted manner to specific requirements. In general the fillers are inorganic and/or organic fillers. The inorganic fillers are in particular selected from silicic acids (including hydrophobized silicic acids), quartz flour, chalks, titanium dioxide, zinc oxide, zirconium oxide, barytes, glass particles (in particular spherical particles to increase light reflection), glass fibers, carbon fibers, asbestos particles, asbestos fibers and/or metal powders. Organic fillers are for example carbon black, bitumen, crosslinked polyethylene, crosslinked rubber and rubber mixtures, synthetic fibers such as for example polyethylene fibers, polypropylene fibers, polyester fibers, polyamide fibers, aramide fibers, saran fibers, MP fibers or natural fibers such as straw, wool, cotton, silk, flax, hemp, jute and/or sisal. The proportion of the fillers is at most 80 ma %, preferably 1-60 ma %, particularly preferably 5-40 ma % and especially preferably 7-30 ma %, referred to the formulations. Particularly preferably particles and fibers are used that on account of their dimensions do not result in a non-transparent formulation, and in particular so-called nanoparticles are used.

Likewise the further constituents can include crosslinking accelerators. This is then particularly preferred if the polymers according to the invention are used in a bonding that is intended to reach its maximum load-bearing strength a short time after the joining procedure. A large number of chemical compounds are suitable as crosslinking accelerators, in particular Brønsted and/or Lewis acids, such as for example acetic acid, itaconic acid, zinc(II) acetate, cadmium acetate, zinc oxide, sinc stearate, zinc(II) chloride, tin(IV) chloride, dibutyltin oxide, dibutyltin dilaurate, bismuth citrate, bismuth(III) oxide, bismuth titanate, tetrabutylgermanium, tetrabutyltin, titanium boride, titanium(IV) oxide, titanium acetylacetonate, tributyl titanate, sodium chloride, magnesium(II) chloride, zinc acetylacetonate, zinc methacrylate, zinc niobate, tin(II) oxide, tin(IV) oxide, zirconium (IV) acetylacetonate, zirconium(IV) oxide and/or zirconium (IV) silicate.

Likewise, the further constituents can include stabilizers, these being used in order to protect the formulation against external influences such as for example the influence of (processing) heat, shear stress, solar radiation, atmospheric humidity and oxygen. Suitable stabilizers are for example hindered amines (HALS stabilizers), hindered phenols, phosphite and/or aromatic amines, such as for example those commercially obtainable under the trade names KINOX, IRGANOX, DOVERNOX, IONOL, IRGAPHOS, DOVERPHOS and/or WESTON. Particularly preferably the stabilizers used according to the invention contain only one hydrolytically active terminal group per molecule. In the aforementioned formulations the proportion of the stabilizers is at most 3 ma %, preferably between 0.05 and 2.5 ma % and particularly preferably between 0.1 and 2 ma %, referred to the formulations. In a special embodiment a reactive binding of the stabilizer or stabilizers to the modified polymer according to the invention takes place, whereby a stabilizer migration from the bonded joint is prevented.

Besides this the further constituents may include one or more oils, these being natural and/or synthetic oils. These one or more oils preferably have at the processing temperature a viscosity of 0.1 to 1,000 mPa·s, preferably of 1-750 mPa·s, most particularly preferably of 2-500 mPa·s. Suitable oils are for example mineral oils, (medicinal) white oils isobutene oils, butadiene oils, hydrogenated butadiene oils and/or paraffin oils. The proportion of the one or more oils is at most 50 ma %, preferably 1-45 ma %, particularly preferably 3-40 ma % and especially 5-38 ma %, referred to the formulations.

Furthermore, the formulations may contain inorganic and/or organic pigments, UV-active substances, organic and/or inorganic nucleating agents that accelerate the crystallization of the polymers.

In a further preferred form of the formulations according to the invention the aforedescribed formulations are multiphase blends.

In a further embodiment of the processes according to the invention further layers are then applied to the laminates. Corresponding layers have already been described hereinbefore. The application of the further layers is carried out for example by means of roller application, slot die application, knife application, point application, multiline application, rototherm application, spray application in the swirling process, by spincoating or a large area application with melt blow or air assisted spray processes, or by adhesive laminating, (roller) laminating, plasma coating, PVD or CVD techniques and/or other pressure coating or lacquering techniques. A further subject matter of the present invention are displays containing laminates according to the present invention. In principle the laminates are suitable for all types of displays, these preferably being UFB displays (ultra fine & bright), TFT displays (thin film transistor), TFD displays (thin film diode), CSTN displays (color super twist nematic), STN displays (super twist nematic), UBC displays (ultra bright color), LCD displays (liquid crystal display), OLED displays (organic light-emitting diode), plasma displays and/or touchscreens. In particular OLED displays that are produced from polymers (so-called PLED) are suitable.

If the displays are OLED displays, then in particular the barrier effect of the adhesion/bonding layer that increases with increasing crosslinking of the polyolefins according to the invention is of advantage.

A further subject matter of the present invention are flexible electrical modules containing laminates according to the present invention, in particular flexible solar cells.

It is also assumed without further discussion that a person skilled in the art can make use of the above description in its widest scope. The preferred embodiments and examples should for this reason be interpreted as a descriptive disclosure, and in no way as a limiting disclosure.

The present invention is explained in more detail hereinafter with the aid of examples. Alternative embodiments of the present invention can be obtained in a similar way.

Analysis:

a) High Temperature $^{13}$C NMR

The polymer composition is determined by high temperature $^{13}$C NMR. The $^{13}$C NMR spectroscopy of polymers is described for example in the following publications:

[1] S. Berger, S. Braun, H.-O. Kalinowski, $^{13}$C-NMR Spectroscopy, Georg Thieme Verlag Stuttgart 1985
[2] A. E. Tonelli, NMR Spectroscopy and Polymer Microstructure, Verlag Chemie Weinheim 1989
[3] J. L. Koenig, Spectroscopy of Polymers, ACS Professional Reference Books, Washington 1992
[4] J. C. Randall, Polymer Sequence Determination, Academic Press, New York 1977
[5] A. Zambelli et al: Macomolecules, 8, 687 (1975)
[6] A. Filho, G. Galland: J. Appl. Polym. Sci., 80, 1880 (2001)

b) Rheology

The rheological measurements are carried out according to ASTM D 4440-01 ("Standard Test Method for Plastics: Dynamic Mechanical Properties Melt Rheology") using an MCR 501 Rheometer from the Anton Paar company with a plate-plate geometry (plate diameter: 50 mm) as oscillation measurement. In all measurements 1% is used as maximum sample deformation, and the temperature-dependent measurements are carried out at a measurement frequency of 1 Hz and a cooling rate of 1.5 K/min.

The melt viscosity is determined by oscillation rheometry, the determination being carried out at a shear rate of 1 Hz. The maximum deformation of the sample is chosen so that the sample is in the linear viscoelastic range throughout the duration of the measurement. The polymers according to the invention are thus characterized inter alia by the fact that their melting exhibits a viscoelastic behavior. Compared to solid bodies that obey Hook's law, viscoelastic materials are characterized by the ability to dissipate over a certain time stresses resulting from a deformation (relaxation). In contrast to Newtonian fluids, which undergo an exclusively irreversible deformation under the action of a shear/elongation force, viscoelastic fluids can recover a part of the deformation energy after the shear force has been removed (so-called "memory effect") [N. P. Cheremisinoff; "An Introduction to Polymer Rheology and Processing"; CRC Press; London; 1993]. A further characteristic feature of the melts of polymers according to the invention is the occurrence of a so-called structural viscosity. This denotes a behavior in which the shear stress, occurring as a force, breaks up the initial structure of the material depending on the shear rate. Since this dissipation process presupposes a minimum shear rate, the material flows below this shear rate like a Newtonian fluid. An explanation for this is provided by Le Chatelier's principle, in which the "deviation" of the structurally viscous fluid (in front of the mechanical stress) occurs in the direction along the shear faces in order to reduce the frictional resistance. The latter leads to the dissipation of the equilibrium structure of the initial state and to the establishment of a shear-oriented structure, which in turn facilitates the flow (viscosity reduction). In polymer melts the Newtonian region is detectable only at very small shear rates and small shear amplitudes. Its determination is possible and necessary via rheometric test methods ("amplitude sweeps", i.e. measurement at a fixed frequency depending on the shear amplitude), if the measurement is to be carried out in the reversible, i.e. reproducible range [R. S. Lenk; "Rheologie der Kunststoffe"; C. Hanser Verlag; München; 1971; J. Meissner; "Rheologisches Verhalten von Kunststoff-Schmelzen und—Lösungen" in: "Praktische Rheologie der Kunststoffe"; VDI-Verlag; Düsseldorf; 1978; J.-F. Jansson; Proc. 8th. Int. Congr. Rheol.; 1980; Vol. 3]. Vibration rheometry is on account of its low force action, its low deformation and the therefore low effect on the sample morphology ideally suited to investigating materials that exhibit a structurally viscous behavior.

c) Needle Penetration (PEN)

The needle penetration is determined according to DIN EN 1426.

d) DSC

The determination of the melt enthalpy, the glass transition temperature and the melt range of the crystalline fraction is carried out by differential calorimetry (DSC) according to DIN 53 765 from the $2^{nd}$ heating curve at a heating rate of 10 K/min. The point of inflection of the heat flow curve is evaluated as the glass transition temperature.

e) Softening Point (Ring & Ball)

The determination of the softening point according to the ring & ball method is carried out according to DIN EN 1427.

f) Adhesion Shear Strength

The determination of the adhesion shear strength is carried out according to DIN EN 1465.

g) RFA Spectroscopy

The samples cast and hardened in aluminum shells are punched out with a punching iron (diameter 30 mm). The determination is carried out as a double determination. The layer thickness of the polymer samples is >5 mm. The samples are placed in the sample holder and measured (measuring device: PANalytical PW 2404). The quantitative determination is carried out against an extreme calibration of Si in borax tablets.

h) Xylene Solubility

A xylene isomer mixture is used, wherein the polymer is dissolved under reflux and the solution is then cooled to room temperature. 2 g of polyolefin are dissolved in 250 ml of xylene while stirring and heating to the boiling point of xylene. The polymer solution was boiled under reflux for 20 minutes and then left to cool to 25° C. Undissolved and precipitated polyolefin is filtered off (15 cm suction filter, Sartorius 390 filter paper) and dried. The remaining polymer solution is precipitated in a 5-fold excess of methanol (one drop of 37% aqueous HCl being added). The resultant precipitate is filtered off and dried at 80° C. in a drying cabinet (vacuum).

i) Solubility in THF

The solubility in THF is a characteristic property of partially crystalline polyolefins. The procedure is carried out in a similar way to the solution experiments in xylene.

EXAMPLES

1 Polyolefins Used According to the Invention

|  | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|
| $C_2$-fraction [ma %] | 4 | 6.5 | 7 | 8 | 5 | 11 | 14 | 1 | 6 | 8.5 |
| $C_3$-fraction [ma %] | 68 | 61 | 63.5 | 58 | 66 | 60 | 70 | 0 | 0 | 1 |

-continued

|  | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|
| $C_4$-fraction [ma %] | 28 | 32.5 | 29.5 | 34 | 29 | 29 | 16 | 99 | 94 | 90.5 |
| $\eta_{190°\,C.}$ [mPa·s] | 5000 | 2000 | 10700 | 3300 | 14500 | 5600 | 6900 | 4000 | 4500 | 11300 |
| $T_{soft.}$ [° C.] | 98 | 92 | 102 | 91 | 98 | 157 | 158 | 112 | 88 | 99 |
| PEN [0.1 mm] | 19 | 23 | 18 | 22 | 15 | 35 | 26 | 6 | 9 | 10 |
| $T_g$ [° C.] | −29 | −36 | −30 | −34 | −32 | −38 | −37 | −39 | −41 | −42 |
| $\Delta H_M$ [J/g] | 17.8 | 10.7 | 8.5 | 11.8 | 14.2 | 15.6 | 18.4 | 26.7 | 12.8 | 10.4 |
| Si content [ma %] | 0.35 | 0.45 | 0.30 | 0.55 | 0.35 | 0.50 | 0.45 | 0.65 | 1.0 | 0.60 |
| XSol* [ma %] | 100 | 100 | 99 | 100 | 98 | 95 | 96 | 100 | 100 | 98 |
| THFSol** [ma %] | 100 | 100 | 99 | 100 | 99 | 41 | 22 | 35 | 53 | 46 |

*Fractions soluble in xylene at room temperature
**Fractions soluble in tetrahydrofuran at room temperature 2 Adhesive Effect on Plexiglas (Polymethyl Methacrylate, Evonik Röhm GmbH, Molding Composition 7N)

100 g portions of the modified polyolefins are melted for one hour in a drying cabinet at 180° C. under a protective gas atmosphere (e.g. nitrogen, argon, etc.). The can containing the hot melt is then stirred on a hotplate with an IKA stirrer with kneader. 5 g of DBTL masterbatch (consisting of 98 ma % VESTOPLAST® 708 (Evonik Degussa GmbH) and 2 ma % of dibutyltin dilaurate) are added at 170° C. and homogenized for 15 minutes. The polymer melt is then applied at a specific bonding temperature (with the aid of a thermosensor) to a polymethyl methacrylate test body (thickness: 2 mm, moulding composition "7N", Evonik Röhm GmbH). This is joined within 20 seconds to a further polymethyl methacrylate test body (thickness: 2 mm, moulding composition "7N", Evonik Röhm GmbH) in a simple overlapping manner on an area of 4 cm², and pressed together for 5 minutes under a weight of 2 kg. Projecting adhesive polymer is removed. The bonding test specimen is then stored for 14 days at 20° C./65% relative atmospheric humidity in a climatically controlled cabinet and its mechanical properties are then tested by means of tensile tests.

The following results are achieved at a bonding temperature of 170° C. (Table 2):

| Example No. | Polyolefin used | Adhesive shear strength [N/mm²] |
|---|---|---|
| 12 | VESTOPLAST® 750[1] (not according to the invention) | 0.30 |
| 13 | According to Example 1 (according to the invention) | 1.10 |
| 14 | According to Example 4 (according to the invention) | 0.55 |
| 15 | According to Example 5 (according to the invention) | 0.80 |

[1]Evonik Degussa GmbH

The following results are achieved at a bonding temperature of 240° C. (Table 3):

| Example No. | Polyolefin used | Adhesive shear strength [N/mm²] |
|---|---|---|
| 16 | VESTOPLAST® 750[1] (not according to the invention) | no test |
| 17 | According to Example 1 (according to the invention) | 1.60 |
| 18 | According to Example 4 (according to the invention) | 0.70 |
| 19 | According to Example 5 (according to the invention) | 1.10 |

[1]Evonik Degussa GmbH

3 Adhesive Effect on Polypropylene

The modified polyolefins are melted for one hour at 190° C. in a drying cabinet under a protective gas atmosphere (e.g. nitrogen, argon, etc.) and then applied at a temperature of 170° C. (with the aid of a thermosensor) to a polypropylene test body (thickness: 2 mm, isotactic polypropylene, "PP-DWST"/manufacturer: Simona AG). This is joined within 20 seconds to a further polypropylene test body (thickness: 2 mm, isotactic polypropylene, "PP-DWST"/manufacturer: Simona AG) on an area of 4 cm² in a simple overlapping manner and the two parts are pressed together for 5 minutes under a weight of 2 kg. Projecting adhesive polymer is removed. The bonded test specimen is then stored for 14 days at 20° C./65% relative atmospheric humidity in a climatically controlled cabinet and its mechanical properties are then tested by means of tensile tests (Table 4).

| Example No. | Polyolefin used | Adhesive shear strength [N/mm²] |
|---|---|---|
| 20 | VESTOPLAST® 708[1] (not according to the invention) | 1.05 |
| 21 | According to Example 1 (according to the invention) | 1.75 |
| 22 | According to Example 2 (according to the invention) | 1.55 |
| 23 | According to Example 3 (according to the invention) | 1.55 |

-continued

| Example No. | Polyolefin used | Adhesive shear strength [N/mm$^2$] |
|---|---|---|
| 24 | According to Example 4 (according to the invention) | 2.25 |
| 25 | According to Example 5 (according to the invention) | 1.70 |
| 26 | According to Example 6 (according to the invention) | 1.2 |
| 27 | According to Example 7 (according to the invention) | 1.35 |
| 28 | According to Example 8 (according to the invention) | 1.10 |
| 29 | According to Example 9 (according to the invention) | 1.55 |
| 30 | According to Example 10 (according to the invention) | 1.45 |

[1]Evonik Degussa GmbH

4 Adhesive Effect on Polyethylene 100 g portions of the modified polyolefins are melted for one hour in a drying cabinet at 180° C. under a protective gas atmosphere (e.g. nitrogen, argon, etc.). The can containing the hot melt is then stirred on a hotplate with an IKA stirrer with kneader. 5 g of DBTL masterbatch (consisting of 98 ma % VESTOPLAST® 708 (Evonik Degussa GmbH) and 2 ma % of dibutyltin dilaurate) are added at 170° C. and homogenized for 15 minutes. The polymer melt is then applied at 170° C. (with the aid of a thermosensor) to a polyethylene test body (thickness: 2 mm; "PE-HWST", manufacturer: Simona AG). This is joined within 20 seconds to a further polyethylene test body (thickness: 2 mm; "PE-HWST", manufacturer: Simona AG) on an area of 4 cm$^2$ in a simple overlapping manner and the two parts are pressed together for 5 minutes under a weight of 2 kg. Projecting adhesive polymer is removed. The bonded test specimen is then stored for 14 days at 20° C./65% relative atmospheric humidity in a climatically controlled cabinet and its mechanical properties are then tested by means of tensile tests (Table 5).

| Example No. | Polyolefin used | Adhesive shear strength [N/mm$^2$] |
|---|---|---|
| 31 | VESTOPLAST® 750[1] (not according to the invention) | 0.70 |
| 32 | According to Example 1 (according to the invention) | 1.48 |
| 33 | According to Example 4 (according to the invention) | 0.83 |
| 34 | According to Example 5 (according to the invention) | 1.2 |

[1]Evonik Degussa GmbH

5 Adhesive Effect on Poly(Ethylene Terephthalate) (PET)

100 g portions of the modified polyolefins are melted for one hour in a drying cabinet at 180° C. under a protective gas atmosphere (e.g. nitrogen, argon, etc.). The can containing the hot melt is then stirred on a hotplate with an IKA stirrer with kneader. 5 g of DBTL masterbatch consisting of 98 ma % VESTOPLAST® 708 (Evonik Degussa GmbH) and 2 ma % of dibutyltin dilaurate) are added at 170° C. and homogenized for 15 minutes. The polymer melt is then applied at 170° C. (with the aid of a thermosensor) to a polyethylene terephthalate test body (thickness: 2 mm; "Axpet clear 099", manufacturer: Bayer Material Science). This is joined within 20 seconds to a further polyethylene terephthalate test body (thickness: 2 mm; "Axpet clear 099", manufacturer: Bayer Material Science) on an area of 4 cm$^2$ in a simple overlapping manner and the two parts are pressed together for 5 minutes under a weight of 2 kg. Projecting adhesive polymer is removed. The bonded test specimen is then stored for 14 days at 20° C./65% relative atmospheric humidity in a climatically controlled cabinet and its mechanical properties are then tested by means of tensile tests (Table 6).

| Example No. | Polyolefin used | Adhesive shear strength [N/mm$^2$] |
|---|---|---|
| 35 | VESTOPLAST® 750[1] (not according to the invention) | 0.40 |
| 36 | According to Example 1 (according to the invention) | 1.55 |
| 37 | According to Example 4 (according to the invention) | 1.23 |
| 38 | According to Example 5 (according to the invention) | 1.54 |

[1]Evonik Degussa GmbH

6 Adhesive Effect on Polyamide-6 (PA-6)

100 g portions of the modified polyolefins are melted for one hour in a drying cabinet at 180° C. under a protective gas atmosphere (e.g. nitrogen, argon, etc.). The can containing the hot melt is then stirred on a hotplate with an IKA stirrer with kneader. 5 g of DBTL masterbatch (consisting of 98 ma % VESTOPLAST® 708 (Evonik Degussa GmbH) and 2 ma % of dibutyltin dilaurate) are added at 170° C. and homogenized for 15 minutes. The polymer melt is then applied at 170° C. (with the aid of a thermosensor) to a polyamide-6 test body (thickness: 2 mm; "Sustamid 6", manufacturer: Cadillac Plastic). This is joined within 20 seconds to a further polyamide-6 test body (thickness: 2 mm; "Sustamid 6", manufacturer: Cadillac Plastic) on an area of 4 cm$^2$ in a simple overlapping manner and the two parts are pressed together for 5 minutes under a weight of 2 kg. Projecting adhesive polymer is removed. The bonded test specimen is then stored for 14 days at 20° C./65% relative atmospheric humidity in a climatically controlled cabinet and its mechanical properties are then tested by means of tensile tests (Table 7).

| Example No. | Polyolefin used | Adhesive shear strength [N/mm$^2$] |
|---|---|---|
| 39 | VESTOPLAST® 750[1] (not according to the invention) | 0.62 |
| 40 | According to Example 1 (according to the invention) | 1.95 |
| 41 | According to Example 4 (according to the invention) | 1.30 |
| 42 | According to Example 5 (according to the invention) | 2.05 |

[1]Evonik Degussa GmbH

7 Adhesive Effect on Polycarbonate 100 g portions of the modified polyolefins are melted for one hour in a drying cabinet at 180° C. under a protective gas atmosphere (e.g. nitrogen, argon, etc.). The can containing the hot melt is then stirred on a hotplate with an IKA stirrer with kneader. 5 g of DBTL masterbatch (consisting of 98 ma % VESTOPLAST® 708 (Evonik Degussa GmbH) and 2 ma % of dibutyltin dilaurate) are added at 170° C. and homogenized for 15 minutes. The polymer melt is then applied at 170° C. (with the aid of a thermosensor) to a polycarbonate test body (thickness: 2 mm; "Makrolon Mono", manufacturer: Bayer Material Science). This is then joined within 20 seconds to a further polycarbonate test body (thickness: 2 mm; "Makrolon Mono", manufacturer: Bayer Material Science) on an area of 4 cm² in a simple overlapping manner and the two parts are pressed together for 5 minutes under a weight of 2 kg. Projecting adhesive polymer is removed. The bonded test specimen is then stored for 14 days at 20° C./65% relative atmospheric humidity in a climatically controlled cabinet and its mechanical properties are then tested by means of tensile tests (Table 8).

| Example No. | Polyolefin used | Adhesive shear strength [N/mm²] |
|---|---|---|
| 43 | VESTOPLAST ® 750[1] (not according to the invention) | 0.21 |
| 44 | According to Example 1 (according to the invention) | 1.20 |
| 45 | According to Example 4 (according to the invention) | 0.70 |
| 46 | According to Example 5 (according to the invention) | 1.15 |

[1]Evonik Degussa GmbH

8 Adhesive Effect on Glass 100 g portions of the modified polyolefins are melted for one hour in a drying cabinet at 180° C. under a protective gas atmosphere (e.g. nitrogen, argon, etc.). The can containing the hot melt is then stirred on a hotplate with an IKA stirrer with kneader. 5 g of DBTL masterbatch (consisting of 98 ma % VESTOPLAST® 708 (Evonik Degussa GmbH) and 2 ma % of dibutyltin dilaurate) are added at 170° C. and homogenized for 15 minutes. The polymer melt is then applied at 170° C. (with the aid of a thermosensor) to a degreased glass test body (thickness: 2 mm). This is joined within 20 seconds to a further degreased glass test body (thickness: 2 mm) on an area of 4 cm² in a simple overlapping manner and the two parts are pressed together for 5 minutes under a weight of 2 kg. Projecting adhesive polymer is removed. The bonded test specimen is then stored for 14 days at 20° C./65% relative atmospheric humidity in a climatically controlled cabinet and its mechanical properties are then tested by means of tensile tests (Table 8).

| Example No. | Polyolefin used | Adhesive shear strength [N/mm²] |
|---|---|---|
| 43 | VESTOPLAST ® 708[1] (not according to the invention) | <0.1 |
| 44 | According to Example 1 (according to the invention) | 2.5 |
| 45 | According to Example 4 (according to the invention) | 3.7 |
| 46 | According to Example 5 (according to the invention) | 3.2 |

[1]Evonik Degussa GmbH

9 Water Vapor Permeability of Polyolefin Laminates

Example 47

Not According to the Invention

Using a ZSK 25 double screw extruder (Werner & Pfleiderer) with a downstream connected extrusion tool for producing blown films, a blown film is produced in a thickness of 0.052 mm at 200° C. from a high pressure polyethylene (LDPE) produced by SABIC (Sabic LDPE 2101). The determination of the water vapor permeability is then carried out according to DIN 53122 T2. A water vapor permeability of 4.6 g/m²·d is measured.

Example 48

Not According to the Invention

Using a ZSK 25 double screw extruder (Werner & Pfleiderer) with a downstream connected extrusion tool for producing flat films, a flat film is produced in a thickness of 0.048 mm at 200° C. from a linear low density polyethylene (LLDPE) produced by SABIC (Sabic LLDPE 3188). The determination of the water vapor permeability is then carried out according to DIN 53122T2. A water vapor permeability of 2.8 g/m²·d is measured.

Example 49

Not According to the Invention

Using a ZSK 25 double screw extruder (Werner & Pfleiderer) with a downstream connected extrusion tool for producing flat films, a flat film is produced in a thickness of 0.058 mm at 200° C. from an isotactic polypropylene produced by SABIC (Sabic PP 520 P). The determination of the water vapor permeability is then carried out according to DIN 53122T2. A water vapor permeability of 1.4 g/m²·d is measured.

Example 50

According to the Invention

The polyethylene film produced in Example 47 is coated with a melt (consisting of 100 g of polymer of Example 1 according to the invention and 5 g of DBTL masterbatch (consisting of 98 ma % VESTOPLAST® 708 (Evonik Degussa GmbH) and 2 ma % dibutyltin dilaurate)) using a 20 μm knife at a temperature of 135° C., the application weight being ca. 11 g/m². The coated film is stored for 7 days in a climatically controlled cabinet (20° C./65% relative atmospheric humidity). The determination of the water vapor permeability is then carried out according to DIN 53122T2. A water vapor permeability of <0.001 g/m²·d is measured.

Example 51

According to the Invention

The polyethylene film produced in Example 48 is coated with a melt (consisting of 100 g of polymer of Example 4 according to the invention and 5 g of DBTL masterbatch (consisting of 98 ma % VESTOPLAST® 708 (Evonik Degussa GmbH) and 2 ma % dibutyltin dilaurate)) using a 20 µm knife at a temperature of 135° C., the application weight being ca. 11 g/m². The coated film is stored for 7 days in a climatically controlled cabinet (20° C./65% relative atmospheric humidity). The determination of the water vapor permeability is then carried out according to DIN 53122T2. A water vapor permeability of <0.001 g/m²·d is measured.

Example 52

According to the Invention

The polypropylene film produced in Example 48 is coated with a melt (consisting of 100 g of polymer of Example 5 according to the invention and 5 g of DBTL masterbatch (consisting of 98 ma % VESTOPLAST® 708 (Evonik Degussa GmbH) and 2 ma % dibutyltin dilaurate)) using a 20 µm knife at a temperature of 135° C., the application weight being ca. 11 g/m². The coated film is stored for 7 days in a climatically controlled cabinet (20° C./65% relative atmospheric humidity). The determination of the water vapor permeability is then carried out according to DIN 53122T2. A water vapor permeability of <0.001 g/m²·d is measured.

10. Production of Glass/Plastic Laminates

Example 53

According to the Invention

A thin glass disk (thickness: 50 µm; borosilicate glass AF 45; manufacturer: Schott AG) is coated at a temperature of 135° C. with a melt (consisting of 100 g of the polymer of Example 5 according to the invention and 5 g DBTL masterbatch (consisting of 98 ma % VESTOPLAST® 708 (Evonik Degussa GmbH) and 2 ma % dibutyltin dilaurate)) using a 20 µm knife, the application weight being ca. 11 g/m². The polypropylene film produced in Example 48 is then laminated onto this coating with the aid of a heated roller (80° C., pressing force: 500 hPa). The coated glass disk is then stored for 7 days in a climatically controlled cabinet (20° C./65% relative atmospheric humidity). A transparent flexurally elastic composite is obtained that does not delaminate or become non-transparent even after 50 bending tests (bending radius: 90 mm).

Example 54

According to the Invention

A thin glass disk (thickness: 50 µm; borosilicate glass D263T; manufacturer: Schott AG) is coated at a temperature of 135° C. with a melt (consisting of 100 g of the polymer of Example 5 according to the invention and 5 g DBTL masterbatch (consisting of 98 ma % VESTOPLAST® 708 (Evonik Degussa GmbH) and 2 ma % dibutyltin dilaurate)) using a 20 µm knife, the application weight being ca. 11 g/m². A further thin glass disk (thickness: 50 µm; borosilicate glass D263T; manufacturer: Schott AG) is then laminated onto this coating immediately after the application of the modified polyolefin according to the invention. The glass laminate is stored for 7 days in a climatically controlled cabinet (20° C./65% relative atmospheric humidity). A transparent, flexurally elastic composite is obtained that does not delaminate or become non-transparent even after 50 bending tests (bending radius: 120 mm).

Example 55

According to the Invention

A thin PMMA disk (thickness: 250 µm; borosilicate glass D263T; manufacturer: Schott AG) is coated at a temperature of 240° C. with a melt (consisting of 100 g of the polymer of Example 5 according to the invention and 5 g DBTL masterbatch (consisting of 98 ma % VESTOPLAST® 708 (Evonik Degussa GmbH) and 2 ma % dibutyltin dilaurate)) using a 20 µm knife, the application weight being ca. 11 g/m². The polypropylene film produced in Example 48 is laminated onto this coating using a heated roller (80° C., pressing force: 500 hPa). The coated glass disk is stored for 7 days in a climatically controlled cabinet (20° C./65% relative atmospheric humidity). A transparent, flexurally elastic composite is obtained, that does not delaminate or become non-transparent even after 50 bending tests (bending radius: 120 mm).

The invention claimed is:
1. A laminate comprising:
 a flat glass body;
 a body applied to at least one side of the flat glass body; and
 an intermediate adhesion promoter layer between the flat glass body and the applied body;
 wherein
 the body applied to the flat glass body is glass, plastic or a mixture thereof, and
 the intermediate adhesion promoter layer comprises at least one silane modified polyolefin, the polyolefin being a polyethylene-co-propylene-co-1-butene) comprising:
 2 to 25% by weight ethene;
 50 to 80% by weight propene; and
 7 to 98% by weight of butene
 wherein said polyolefin has a propylene fraction of from 50 to 80 ma % and a solubility in tetrahydrofuran at room temperature of at least 70 ma %.
2. The laminate as claimed in claim 1, wherein a thickness of the flat glass body and applied body is each at most 8 mm.
3. The laminate as claimed in claim 1, wherein a thickness of the intermediate adhesion promoter layer is at most 6.5 mm.
4. The laminate as claimed in claim 1, wherein the laminate further comprises one or more layers, which are present on one or both sides of the laminate.
5. The laminate as claimed in claim 1, wherein the laminate is flexible.
6. The laminate as claimed in claim 1, wherein the polyolefin is partially crystalline.
7. The laminate as claimed in claim 1, wherein said butene is 1-butene.
8. The laminate as claimed in claim 1, wherein the silane modified polyolefin is modified with a silane which is at least one silane selected from the group consisting of vinyltrimethoxysilane, vinyltriethoxysilane, vinyl-tris(2-methoxy-ethoxy-)silane, 3-methacryloxypropyltrimethoxysilane, 3-methacryloxypropyltriethoxysilane, vinyldimethylethoxysilane and vinylmethyldibutoxysilane.
9. A method for the production of the laminate as claimed in claim 1, comprising:

applying said at least one silane modified polyolefin to at least one side of the flat glass body to form the intermediate adhesion promoter layer; and then applying the at least one body to the at least one intermediate adhesion promoter layer.

10. The method as claimed in claim 9, wherein said at least one silane modified polyolefin is applied in the form of a solution or melt.

11. The method as claimed in claim 9, wherein the application of said at least one silane modified polyolefin is performed by a technique selected from the group consisting of spray application, knife application, spincoating, roller application and pressure techniques.

12. The method as claimed in claim 9, wherein the at least one silane modified polyolefin is a polymer film.

13. The method as claimed in claim 9, further comprising applying one or more layers to one or both sides of the laminate.

14. A display comprising a laminate as claimed in claim 1.

15. The display as claimed in claim 14, wherein the display is a UFB display, a TFT display, a TFD display, a CSTN display, a STN display, a UBC display, an LCD display, an OLED display, a plasma display and/or a touchscreen.

16. A flexible electrical module comprising at least one laminate as claimed in claim 1.

17. A solar cell comprising the flexible electrical module as claimed in claim 16.

18. A laminate comprising:
at least one flat plastic body of a first plastic;
a body applied to at least one side of the flat plastic body; and
an intermediate adhesion promoter layer between the flat plastic body and said body;
wherein
said body is of the same plastic or a plastic different from the first plastic of said flat plastic body, and
the intermediate adhesion promoter layer comprises at least one silane modified polyolefin, the polyolefin being a poly(ethylene-co-propylene-co-1-butene) comprising:
2 to 25% by weight ethene;
50 to 80% by weight propene; and
7 to 98% by weight of butene
wherein said polyolefin has a propylene fraction of from 50 to 80 ma % and a solubility in tetrahydrofuran at room temperature of at least 70 ma %.

19. The laminate as claimed in claim 18, wherein said butene is 1-butene.

20. A method for the production of the laminate as claimed in claim 18, comprising:
applying said at least one silane modified polyolefin to at least one side of the flat plastic body of a first plastic to form the intermediate adhesion promoter layer; and then
applying said body to the intermediate adhesion promoter layer.

* * * * *

UNITED STATES PATENT AND TRADEMARK OFFICE
CERTIFICATE OF CORRECTION

PATENT NO. : 9,550,344 B2  
APPLICATION NO. : 12/992792  
DATED : January 24, 2017  
INVENTOR(S) : Hinnerk Gordon Becker et al.

Page 1 of 1

It is certified that error appears in the above-identified patent and that said Letters Patent is hereby corrected as shown below:

On the Title Page

Item (54), the Title Information is incorrect.  
Item (54) should read:  
--(54) USE OF SILANE-MODIFIED POLYOLEFINS AS ADHESION PROMOTERS FOR THE PRODUCTION OF FLAT LAMINATES--

Also, Item (30), the Foreign Application Priority Data Information, has been omitted.  
Item (30) should read:  
--(30)    Foreign Application Priority Data  
Aug. 15, 2008   (DE)............................ 10 2008 041 278.3--

Signed and Sealed this  
Second Day of January, 2018

Joseph Matal  
*Performing the Functions and Duties of the  
Under Secretary of Commerce for Intellectual Property and  
Director of the United States Patent and Trademark Office*